(12) United States Patent
Spohn

(10) Patent No.: US 6,645,590 B1
(45) Date of Patent: Nov. 11, 2003

(54) ARTICLES OF FUNCTIONAL FLUOROPOLYMER

(75) Inventor: Peter Dwight Spohn, Jaffrey, NH (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 09/317,707

(22) Filed: May 24, 1999

Related U.S. Application Data

(60) Provisional application No. 60/091,139, filed on Jun. 29, 1998.

(51) Int. Cl.[7] .................................................. B32B 5/16
(52) U.S. Cl. ...................................... 428/36.9; 428/421
(58) Field of Search ......................................... 428/36.9

(56) References Cited

U.S. PATENT DOCUMENTS

| | | | |
|---|---|---|---|
| 5,576,106 A | 11/1996 | Kerbow et al. | 428/403 |
| 5,977,241 A | * 11/1999 | Koloski et al. | 524/502 |

FOREIGN PATENT DOCUMENTS

| | | | |
|---|---|---|---|
| EP | 0 626 424 A1 | 11/1994 | C08L/27/12 |
| EP | 0 650 987 A1 | 5/1995 | C08F/259/08 |
| EP | 0 761 757 A1 | 3/1997 | C08L/51/00 |
| EP | 0 906 934 A | 4/1999 | C08K/13/02 |
| EP | 0 957 148 A1 | 11/1999 | C09J/127/18 |
| JP | 2216704 | 8/1990 | C08F/259/08 |
| JP | 7041563 | 2/1995 | C08J/3/24 |
| JP | 8157684 | 6/1996 | C08F/259/08 |

* cited by examiner

Primary Examiner—Sandra M. Nolan

(57) ABSTRACT

Articles such as tubing and wire insulation made from fluoropolymer having functional groups exhibit improved mechanical properties.

10 Claims, No Drawings

ARTICLES OF FUNCTIONAL FLUOROPOLYMER

RELATED APPLICATION

This application claims the benefit of Provisional Application No. 60/091,139 filed Jun. 29, 1998.

FIELD OF THE INVENTION

This invention is in the field of fluoropolymers having functional side groups, and is concerned with articles made from such fluoropolymers.

BACKGROUND OF THE INVENTION

Thermoplastic fluoropolymers are well known for outstanding combinations of properties including chemical resistance, unique surface characteristics, high service temperatures, and good dielectric characteristics. As a result, fluoropolymer resins are used in a wide variety of applications including wire insulation, cable jacket, hose, tubing, film, linings for chemical process equipment, articles for fluid handling in laboratory and manufacturing situations, and the like. The service temperature in some of these applications can be high. As is common for thermoplastics, some properties of fluoropolymers change as temperature increases. Modulus and tensile strength, for example, typically decrease with increasing temperature, and fabricated articles such as tubing and wire insulation typically have lower cut-through resistance at high temperature.

Fluoropolymer articles having improved properties, particularly at high temperature, are desired.

The use of functional groups in fluoropolymers has been aimed at modifying the surface characteristics of fluoropolymers. For example, Kerbow in U.S. Pat. No. 5,576,106 discloses a grafted fluoropolymer powder that is effective in such uses as an adhesive to join dissimilar materials, Iura et al. in European Patent Application Publication EP 0 761 757 disclose a fluorine-containing polymer alloy of a grafted fluorine-containing polymer and a polymer containing no fluorine, and Shimizu et al. in European Patent Application Publication 0 626 424 disclose a blend of a thermoplastic resin and a fluoropolymer having a functional group that improves interfacial affinity with the thermoplastic resin.

SUMMARY OF THE INVENTION

This invention provides articles made from melt-fabricable fluoropolymer resin and having improved mechanical properties. Preferred such articles include tubing and wire insulation, which exhibit improved cut-through resistance.

The fluoropolymer resin from which such articles are made has pendant functional groups. Such groups can be produced by grafting a polar-functional compound to the fluoropolymer.

DETAILED DESCRIPTION

It has been discovered that addition of functional groups to fluoropolymers can result in surprising improvement of bulk properties. Improved properties are evident at room temperature, but are accentuated at elevated temperatures.

The articles of this invention can be fabricated by conventional melt processing techniques. For example, articles can be formed by melt extrusion, using such techniques as pressure extrusion or extrusion accompanied by melt draw, or by injection molding. The processes of fabricating the articles of the present invention are new in that the melt-fabricable fluoropolymer resin used has pendant functional groups.

Generally, when articles of this invention are fabricated by melt extrusion, a cross-section of such articles normal to the extrusion direction is characterized by a perimeter that is a closed figure. Such figures include, for example, regular geometric shapes such as circles, ellipses, rectangles and the like, and also irregular shapes including shapes that are either minor or major departures from regular shapes. Preferably, extruded articles of the invention have general axial symmetry though not necessarily exact axial symmetry. For example, convoluted tubing having helical convolutions does not have exact axial symmetry, but is considered for purposes of the present invention to have general axial symmetry (or near axial symmetry). Preferred extruded articles include wire insulation, cable jacket, tubing including convoluted tubing, hose, and the like.

Articles of the present invention exhibit improved mechanical properties. Such improvements include increased stiffness and increased toughness, the latter indicated, e.g., by increased force required to cut through a thin section. Such improvement can be evident at room temperature, but may be more pronounced at elevated temperature. For wire insulation of the present invention, substantial increases in cut-through resistance have been observed at 150° C. See Example 1, which discloses an increase of about 100%. Such large increases are not required for articles of the invention. Cut-through resistance of wire insulation or tubing at 150° C., for example, is generally at least 25% greater than for such articles made from comparable fluoropolymer resin but not having pendant functional groups, and is preferably at least 50% greater. Stiffness (flex modulus) is also increased. For example, flex modulus at room temperature is generally increased by at least 10% relative to that of the same article made from similar fluoropolymer lacking pendant functional groups.

The fluoropolymer having pendant functional groups exhibits a reduction in melt flow rate (increase in melt viscosity) after being exposed to elevated temperature such as may be encountered during melt fabrication of the article. This reduction in melt flow indicates that cross-linking occurs, even in the absence of cross-linking promoter or catalytic agent.

Articles of the present invention are fabricated essentially from fluoropolymer resin having pendant functional groups. The articles consist essentially of such resin in the sense that other substance or material which may react with said pendant functional groups is not present. Thus, for example, no cross-linking promoter or co-agent or such material is present. Likewise, no fluorine-free polymer is present as a component of a blend or alloy, or as a reinforcing component. However, articles of the invention can contain inert additives present in minor amount, such as pigments, or present merely as filler, such as carbon. Additives such as thermal or oxidative stabilizers that are normally present in fluoropolymer resins can be present in usual amounts in articles of the invention.

As used herein, "functionalized fluoropolymer" means fluoropolymer having functional side groups or functional groups attached to side groups, i.e., pendant functional groups. Usually, but not necessarily, such functional units are at the ends of the pendant side groups. Fluoropolymer that does not have such pendant functional groups is sometimes described herein as "non-functional fluoropolymer".

Thus, non-functional fluoropolymer and functionalized fluoropolymer differ at least by the presence in the latter of pendant functional groups. Non-functional fluoropolymer can be a precursor to functionalized fluoropolymer, in which instance the process of functionalizing involves addition of functional groups to the non-functional polymer. However, "functionalizing" is also used in a broader sense herein to include preparation of functionalized fluoropolymer which would be non-functional if pendant functional groups were not present, even though non-functional fluoropolymer may not be the precursor.

Functional groups, in the context of the present invention, are groups capable of improving the mechanical properties of fluoropolymer articles when such functional groups are present in a fluoropolymer composition. Improvement of mechanical properties is indicated, for example, by an increase in cut-through resistance (e.g., as measured for wire insulation or for tubing) or by an increase in stiffness (flex modulus), as discussed above. Functional groups that can improve the properties of fluoropolymers when present include ester, alcohol, acid (including carbon-, sulfur-, and phosphorus-based acid) and salt and halide thereof. Other functionalities include anhydride and epoxide. Preferred functional groups include —$CH_2$—OH and anhydride, especially maleic anhydride. As one skilled in the art will recognize, more than one type of functional group can be present. Normally, however, a single type of functional group is used.

Such functional groups can be introduced, for example, by incorporating into the fluoropolymer, during polymerization, monomer units having such functional groups, i.e., functional monomers, or by having an ethylenically unsaturated compound grafted thereto which imparts polar functionality to the fluoropolymer, the polar functionality being present as part of the ethylenically unsaturated compound. Such grafted fluoropolymer includes the grafted fluoropolymer powder described in U.S. Pat. No. 5,576,106 and the grafted fluoropolymer described in EP 0 650 987. Other known methods of grafting can be used. Preferred polar-grafted fluoropolymers include the surface-grafted powder of the '106 patent. Examples of polar functionality provided by grafting include acids, including carboxylic, sulfonic and phosphonic acids, and esters and salts thereof, and epoxides. Glycidyl methacrylate is an example of a grafting compound that provides epoxide functionality. Among compounds for grafting onto and thereby becoming part of the polar-grafted fluoropolymer, maleic acid and maleic anhydride are preferred. Maleic anhydride can be halogen-substituted, e.g., dichloromaleic anhydride and difluoromaleic anhydride.

The concentration of functional groups in the fluoropolymer resin component, i.e., in the functionalized fluoropolymer or in blends of functionalized fluoropolymer plus non-functional fluoropolymer, if non-functional fluoropolymer is present, of the melt-fabricable fluoropolymer composition of this invention is effective to improve mechanical properties of the article fabricated by melt extrusion or injection molding. For example, the cut-through resistance at 150° C. of wire insulation, tubing, or any other article that can be subjected to the cut-through test is improved by at least 25% relative to the same article made from comparable fluoropolymer but having no pendant functional groups, and is preferably improved by at least 50%. Alternatively, the flex modulus at room temperature is increased by at least 10% over the same article made from similar fluoropolymer having no pendant functional groups. As will be recognized by one skilled in the art, the concentration of functional groups that is effective to achieve improvement may vary at least with the type of functional group. The concentration of functional groups present can be expressed relative to the number of main chain carbon atoms in the fluoropolymer resin. Generally, the concentration of functional groups present is at least about $25/10^6$ main chain C atoms, based on total fluoropolymer in the composition. The concentration of functional groups is usually in the range of 25–2500 per $10^6$ main chain C atoms, preferably in the range of 50–2000 per $10^6$ main chain C atoms, based on total fluoropolymer present.

The desired concentration of functional groups in the functionalized fluoropolymer resin can be achieved with a single fluoropolymer having functional groups, or a mixture of such fluoropolymers. The desired concentration of functional groups can also be achieved by blending functionalized fluoropolymer (or mixture of) having a higher concentration of functional groups with non-functional fluoropolymer (or mixture of), i.e., fluoropolymer having essentially no functional groups. In this embodiment, functionalized fluoropolymer acts as a functional group concentrate that can be let down (diluted) with non-functional fluoropolymer. This approach has the advantage of permitting one to achieve a variety of functional group concentrations with a single functionalized fluoropolymer by varying the blending ratio with non-functional fluoropolymer, and is a preferred embodiment of the invention. Preferably, in a functionalized fluoropolymer that is a blend, the functionalized fluoropolymer component is in minor (lesser) amount relative to non-functional fluoropolymer component.

Thus, in one embodiment of the present invention, the cross-linkable fluoropolymer composition contains minor amounts of functionalized fluoropolymer and a major amount of non-functional fluoropolymer. By "major amount" is meant at least 50 wt %, preferably at least 70 wt %, of non-functional fluoropolymer based on combined weight of non-functional fluoropolymer and functional fluoropolymer. In this embodiment of the invention, then, the concentration of functional groups in the functionalized fluoropolymer will be high enough so that the average concentration of functional groups in the functional fluoropolymer plus the non-functional fluoropolymer will be at least about $25/10^6$ main chain C atoms, usually in the range of 25–2500 per $10^6$ main chain C atoms, and preferably in the range of 50–2000 per $10^6$ main chain C atoms.

A wide variety of fluoropolymers can be used. The fluoropolymer is made from at least one fluorine-containing monomer, but may incorporate monomer, which contains no fluorine or other halogen. Fluorinated monomers include those which are fluoroolefins containing 2 to 8 carbon atoms and fluorinated vinyl ether (FVE) of the formula $CY_2$=CYOR or $CY_2$=CYOR'OR wherein Y is H or F and —R— and —R'— are independently completely fluorinated or partially fluorinated linear or branched alkyl and alkylene groups containing 1 to 8 carbon atoms. Preferred R groups contain 1 to 4 carbon atoms and are preferably perfluorinated. Preferred R' groups contain 2 to 4 carbon atoms and are preferably perfluorinated. Hydrocarbon monomers that can be used include ethylene, propylene, n-butylene, and iso-butylene. When the fluoropolymer is to be functionalized by grafting, preferably at least one monomer contains hydrogen, and in that regard the hydrogen/fluorine atomic ratio in the polymer is preferably at least 0.1/1. The fluoropolymer, however, preferably contains at least 35 wt % fluorine. Fluoropolymer resins that can be used include copolymers of TFE with one or more copolymerizable monomers chosen from perfluoroolefins having 3–8 carbon atoms and perfluoro(alkyl vinyl ethers) (PAVE) in which the linear or branched alkyl group contains 1–5 carbon atoms. Preferred perfluoropolymers include copolymers of TFE with at least one of hexafluoropropylene (HFP) and PAVE. Preferred comonomers include PAVE in which the alkyl group contains 1–3 carbon atoms, especially 2–3 carbon atoms, i.e. perfluoro(ethyl vinyl ether) (PEVE) and perfluoro (propyl vinyl ether) (PPVE). Preferred fluoropolymers also include the copolymers of ethylene with perhalogenated monomers such as TFE or chlorotrifluoroethylene (CTFE), such copolymers being often referred to as ETFE and ECTFE, respectively. In the case of ETFE, minor amounts of additional monomer are commonly used to improve properties such as reduced high temperature brittleness. PPVE, PEVE, perfluorobutyl ethylene (PFBE), and hexafluoroisobutylene (HFIB) are preferred additional comonomers. ECTFE may also have additional modifying comonomer. Other fluoropolymers that can be used include vinylidene fluoride ($VF_2$) polymers including homopolymers and copolymers with other perfluoroolefins, particularly HFP and optionally TFE. TFE/HFP copolymer which contains a small amount of $VF_2$, which copolymer is often referred to as THV, can also be used. Examples of perfluorinated copolymers include TFE with HFP and/or PPVE or PEVE. Representative fluoropolymers are described, for example, in ASTM Standard Specifications D-2116, D-3159, and D-3307. Such fluoropolymers are usually partially-crystalline as indicated by a non-zero heat of fusion associated with a melting, endotherm as measured by DSC on first melting. Alternatively or additionally, preferred fluoropolymers are non-elastomeric, as opposed to elastomeric.

Functionalized fluoropolymers include fluoropolymers such as those described in the foregoing paragraph and additionally containing copolymerized units derived from functional monomers. If the concentration of functional monomer is high enough in a TFE copolymer, however, no other comonomer may be needed. Usually, but not necessarily, the functional groups introduced by such monomers are at the ends of pendant side groups. Examples of functional monomers that introduce pendant side groups having desired functionality include the same ethylenically unsaturated compounds recited above as grafting compounds. Such functional monomers can be incorporated into fluoropolymers, for example, by polymerization in a medium of $CO_2$ as illustrated by example below. Functional monomers that introduce pendant side groups having desired functionality can also have the general formula $CY_2=CY-Z$ wherein Y is H or F and Z contains a functional group. Preferably, Y is F and —Z is —$R_f$—X, wherein $R_f$ is a fluorinated diradical and X is a functional group that may contain $CH_2$ groups. The functional groups include ester, alcohol, acid (including carbon-, sulfur-, and phosphorus-based acid) and salt and halide thereof, anhydride and epoxide. Preferred functional groups include —$CH_2$—OH and anhydride, especially maleic anhydride. As one skilled in the art will recognize, more than one type of functional group can be present. Normally, however, a single type of functional group is used. Preferably, $R_f$—X is linear or branched perfluoroalkoxy having 2–20 carbon atoms, so that the functional comonomer is a fluorinated vinyl ether. Examples of such fluorovinylethers include $CF_2=CF[OCF_2CF(CF_3)]_m$—O—$(CF_2)_n CH_2 OH$ as disclosed in U.S. Pat. No. 4,982,009 and the alcoholic ester $CF_2=CF[OCF_2CF(CF_3)]_m$—O—$(CF_2)_n$—$(CH_2)_p$—O—COR as disclosed in U.S. Pat. No. 5,310,838. Additional fluorovinylethers include $CF_2=CF[OCF_2CF(CF_3)]_m O$ $(CF_2)_n COOH$ and its carboxylic ester $CF_2=CF[OCF_2CF(CF_3)]_m O(CF_2)_n COOR$ disclosed in U.S. Pat. No. 4,138,426. In these formulae, m=0–3, n=1–4, p=1–2 and R is methyl or ethyl. Preferred such fluorovinylethers include $CF_2=CF[OCF_2CF(CF_3)]O(CF_2)_2$—$CH_2$—OH. These fluorovinylethers are useful because of their ability to incorporate into the polymer and their ability to incorporate functionality into the resultant copolymer. Preferred comonomers that introduce pendant functional groups include maleic anhydride, dichloromaleic anhydride, difluoromaleic anhydride, and maleic acid.

When functionalized fluoropolymer is achieved by copolymerization, the amount of functional monomer in the functionalized fluoropolymer of this invention is small to achieve the desired concentration of functional groups, even when functionalized fluoropolymer is a blend comprising non-functional fluoropolymer. Generally, the amount of functional monomer is no more than 10 wt %, preferably no more than 5 wt %, based on total weight of functionalized fluoropolymer, i.e., the fluoropolymer component containing the functional monomer. In certain instances, higher, concentrations of functional monomer exceeding 10 wt % may be desired, for example, when it is not desired to use a non-functional monomer in the functionalized melt-fabricable fluoropolymer. While the functionalized fluoropolymer can be uniform, it is not necessary to have a uniform concentration of functional monomer throughout the functionalized fluoropolymer.

When pendant functional groups are introduced into the melt-fabricable fluoropolymer by, e.g., maleic anhydride or maleic acid, including the halogen-substituted counterparts, either by grafting or by copolymerizing, the amount of grafting compound grafted to the fluoropolymer or the amount of functional comonomer incorporated into the fluoropolymer will generally be in the range of 0.01–1.0 wt %, preferably 0.02–0.5 wt %, based on total fluoropolymer present in the composition. If the composition contains both non-functional fluoropolymer and functionalized fluoropolymer, the functionalized fluoropolymer will have larger amounts of grafted compound or copolymerized comonomer units depending on the proportion of functionalized fluoropolymer in the composition. Generally, the amount of maleic anhydride/acid is in the range of 0.05 wt % to 5 wt % based on the weight of functionalized fluoropolymer in such a fluoropolymer blend. Preferably, the amount of maleic anhydride/acid in the functionalized fluoropolymer component of a blend is 0.1–3 wt %, more preferably 0.1–1 wt %.

EXAMPLES

The following fluoropolymers are used to fabricate articles as described in the examples below.

The fluoropolymer having polar functional groups used in examples below is a copolymer (ETFE) of ethylene (E), tetrafluoroethylene (TFE), and perfluorobutyl ethylene (PFBE) having E/TFE molar ratio of about 0.9, about 1 mol % of PFBE, and melt flow rate (MFR) of 7.4 g/10 min. The polymer is prepared generally by the method of U.S. Pat. No. 3,624,250 as a finely-divided fluff or powder. This fluff is refined by passing it through a comminuting machine (Fitzmill®, Fitzpatrick Co.) using a screen with 0.04-inch (1.0-mm) openings. Average particle size is about 100–120 μm as determined by U.S. Standard screen analysis. Unless otherwise specified, the powder exiting the Fitzmill® (ETFE powder) is used without fractionation, i.e. without classification. Maleic anhydride is grafted to the ETFE powder surface by the irradiation process disclosed by Kerbow in U.S. Pat. No. 5,576,106 to obtain a grafted maleic anhydride concentration of about 0.30 wt %. The grafted ETFE (g-ETFE) powder is formed into granules by compacting with a roll compacter and then granulating with a hammer mill (FitzMill®).

The g-ETFE granules prepared as outlined above are blended in nominally 20/80 and 50/50 ratios by weight with cubes of an ETFE resin having E/TFE molar ratio of about 0.9, about 1 mol % of PFBE, and MFR of about 6.0 g/10 min, and having no pendant functional groups (ETFE-3, following paragraph). The granules and cubes are dry-blended, and the resultant mixtures are melt-blended using a standard single-screw extruder with a metering screw having a mixing section, and the extrudate is strand-cut into cubes. Measured concentrations of grafted maleic anhydride in the blends are 0.034 wt % for the blend (g-blend-20) containing 20 wt % of g-ETFE and 0.12 wt % for the blend (g-blend-50) containing 50 wt % of the g-ETFE. The resultant blends have MFR of 6.4 and 4.0 g/10 min, respectively.

Three ETFE resins in cube form and having no pendant functional group are also used. ETFE-1 has E/TFE molar ratio of about 0.9, about 1 mol % of PFBE, and MFR of 7.4 g/10 min, and thus is similar to the base resin used for g-ETFE powder. ETFE-2 has E/TFE molar ratio of about 0.9, about 1 mol % of PFBE, and MFR of about 11 g/10 min. ETFE-3 has E/TFE molar ratio of about 0.9, about 1 mol % of PFBE, and MFR of about 6.0 g/10 min.

The concentration of grafted maleic anhydride in ETFE compositions used is determined by the method of Kerbow in U.S. Pat. No. 5,576,106 using the infrared absorption peak at about 1795 $cm^{-1}$ and a multiplicative factor of 3.8 to convert absorbance/mil of sample thickness (0.97 to convert absorbance/mm) to concentration in wt %.

The concentration of copolymerized maleic anhydride (MAn) in the TFE/PEVE copolymer exemplified below is estimated by Fourier transform, infrared (FTIR) spectroscopy. A solution of 0.1 g of succinic anhydride in 10 mL of ethanol in a 0.102-mm $CaF_2$ cell gives absorptivities of 1765 $cm^2/g$ at 1867 $cm^{-1}$ and 10,894 $cm^2/g$ at 1790 $cm^{-1}$. When cold pressed as thin films, the TFE/PEVE/MAn terpolymers showed peaks at about 1897 $cm^{-1}$ and about 1820 $cm^{-1}$. The latter is used to estimate copolymerized MAn concentration, assuming that copolymerized maleic anhydride has the same absorptivity as ethanolic succinic anhydride. An absorption band at about 2365 $cm^{-1}$ that has been widely used as an internal thickness band is used to measure film thickness. The spectrum of a commercial TFE/PPVE copolymer (Teflon® PFA fluoropolymer resin grade 340) control sample is subtracted prior to calculation.

Melt flow rate (MFR) of ETFE resins is measured at 297° C. according to ASTM D-3159.

Dynamic cut through measurements on insulated wire samples are made by the method of ASTM D-3032. The same method is used for tubing samples by inserting a mandrel into the tubing.

Flex modulus is measured according to ASTM D-790.

Example 1

Insulation 0.006 inch (0.15 mm) thick is extruded onto AWG 22 conductor from g-blend-20 and ETFE-2, and onto AWG-20 conductor from ETFE-1, using a 1.25-inch (32-mm) Entwistle wire extrusion line equipped with a standard metering screw having a mixing torpedo (U.S. Pat. No. 3,006,029) to provide a uniform melt, and a melt draw technique. Dynamic cut through force is measured at room temperature and at two elevated temperatures. Table 1 shows improved cut-through resistance for the insulation of fluoropolymer having pendant functional groups, with notably better retention of cut-through at the high temperatures.

TABLE 1

Cut Through Resistance Results for Example 1

| T (° C.)\Insulation | Cut Through Force (1b) | | |
|---|---|---|---|
| | g-blend-20 | ETFE-1 | ETFE-2 |
| RT | 25. | 16. | 21. |
| 150 | 4.8 | 2.2 | 2.7 |
| 200 | 20 | 1.1 | 1.2 |

Example 2

Small tubing having nominal outside diameter of 0.400 inch (10.2 mm) and wall thickness of 0.025 inch (0.64 mm) is extruded from g-blend-20, g-blend-50, and ETFE-3. The tubing made from the blends is stiffer than tubing made from ETFE-3, based on hand examination. Additionally, repeated cutting of the tubing made from g-blend-20 with tubing cutters requires more effort than for tubing made from ETFE-3. These observations indicate that the tubing made from fluoropolymer having pendant functional groups has improved properties. The three tubings are cut into small pieces and subjected to melt flow measurement. MFR values in Table 2 show that cross-linking occurs for the fluoropolymers having pendant functional groups, counteracting and in the case of g-blend-50 overcoming the molecular weight reduction that takes place across the tubing fabrication process for fluoropolymer having no pendant functional groups.

TABLE 2

MFR Values for Example 2

| Tubing Resin | MFR (g/10 min) | | |
|---|---|---|---|
| | Before | After | Change (%) |
| ETFE-3 | 6.0 | 8.2 | +37 |
| g-blend-20 | 6.4 | 6.8 | +6 |
| g-blend-50 | 4.0 | 3.6 | −10 |

Polymer Preparation

TFE/PEVE/MAn Copolymer

A 1-liter vertical stirred reactor is charged with 0.5 g of maleic anhydride (MAn) and is closed. The reactor is purged with $CO_2$ by several times charging with $CO_2$ and venting. The reactor is heated to 40° C., and the agitator is started at 800 rpm. The reactor is then charged to a pressure of 1300 psig (9.1 MPa) with a $TFE/CO_2$/ethane mixture of 185 g of TFE, 470 g of $CO_2$ and 2.19 g of ethane, and 30 mL of PEVE are injected. Then, 15 mL of a 0.68 wt % solution of $[CF_3CF_2CF_2OCF(CF_3)COO]_2$ (HFPODP) initiator in $CF_3CF_2CF_2OCF(CF_3)CF_2OCFHCF_3$ are injected. When this amount of initiator solution has been injected, the rate of addition of the same solution is reduced to 0.16 mL/min and this initiator feed is continued to the end of the polymerization. A feed of a $TFE/CO_2$ mixture is also started at the rate of 116 g/hr of TFE and 77 g/hr of $CO_2$ and is continued for 1.5 hr. After 1.5 hr, all feeds and the agitator are stopped, the reactor is vented and opened, and 134 g of polymer solids are recovered as a white powder after devolatilizing for 1 hr at 100° C. in a vacuum oven. The TFE copolymer contains 3.4 wt % of PEVE and 0.08 wt % of MAn. Melt viscosity based on MFR measurement using a 2160 g load but otherwise measured according to ASTM D-3307 at 372° C. is $2.35 \times 10^3$ Pa·s, and $T_m$ is 306° C. MFR behavior upon further high-temperature exposure indicates that cross-linking occurs.

Example 3

A 400 mL autoclave is charged with 1 g of MAn, then chilled to a temperature of less than −20° C., and 5 mL of 0.16-molar HFPODP in $CF_3CF_2CF_2OCFHCF_3$ are added. The autoclave is kept cold, sealed, and evacuated. Then, 64 g of $VF_2$, 50 g of TFE, and 150 g of $CO_2$ are condensed in. Cooling is removed and the autoclave is agitated overnight at ambient temperature, with an exotherm of polymerization carrying the reaction mixture to 45° C. The autoclave is vented and product polymer is recovered as white chunks. After devolatilizing the polymeric product under pump vacuum for 3–4 days, the recovered polymer weighs 90.4 g. The TFE/$VF_2$/MAn copolymer contains 0.3 wt % of MAn and has a melting point of 160° C. with heat of fusion of 25 J/g as determined by differential scanning calorimetry on second heating. The polymer (1g) dissolves in 50 mL of acetone or tetrahydrofuran (THF) at room temperature, giving clear viscous solutions after rolling in a bottle. Inherent viscosity in THF at 25° C. is 3.537. When a 4.33 g sample of the polymer is heated for 1 hr in a vacuum oven at 200°–205° C., the sample weight is reduced by 0.02 g (0.5% weight loss). Rolling a 0.14 g sample of the heat-treated polymer in a bottle with 10 mL of acetone for 1 week causes swelling but little dissolution of the polymer; the weight of the acetone-swollen polymer is 0.11 g after recovery and drying. The reduced solubility indicates that thermal cross-linking occurs during the heat treatment. Thus, fluoropolymer having pendant functional groups introduced during polymerization can be used in articles of the present invention.

What is claimed is:

1. An article that contains no fluorine-free polymer and that is fabricated from fluoropolymer resin by single extruder melt extrusion or injection molding, wherein said fluoropolymer resin has pendant functional groups, said fluoropolymer resin being free of crosslinking promoter.

2. The article of claim 1, wherein said fluoropolymer resin of said article is cross-linked.

3. The article of claim 1, wherein said fluoropolymer resin is a blend comprising non-functional fluoropolymer resin and fluoropolymer resin having pendant functional groups.

4. The article of claim 1, fabricated by injection molding.

5. The article of claim 1, in the form of wire insulation or a cable jacket.

6. Wire insulation, a cable jacket, or tubing that contains no fluorine-free polymer and that consists essentially of fluoropolymer resin which is free of crosslinking promoter, said resin being selected from the group consisting of functionalized fluoropolymer resin and a blend of said functionalized fluoropolymer resin and non-functionalized fluoropolymer resin.

7. The wire insulation a cable jacket, or tubing of claim 6, wherein said functionalized fluoropolymer resin is made from monomers comprising tetrafluoroethylene and at least one copolymerizable monomer selected from perfluoroolefins having 3–8 carbon atoms and perfluoro(alkyl vinyl ethers), said alkyl having 1–5 carbon atoms.

8. The wire insulation, a cable jacket, or tubing of claim 6, wherein said functionalized fluoropolymer resin is made from monomers comprising ethylene and at least one of tetrafluoroethylene and chlorotrifluoroethylene.

9. The wire insulation, a cable jacket, or tubing of claim 6, wherein the functionality of said functionalized fluoropolymer resin is acid, ester, anhydride, or epoxide.

10. The wire insulation, a cable jacket, or tubing of claim 9, wherein the functionality of said functionalized fluoropolymer resin is anhydride.

* * * * *